US006851006B2

(12) United States Patent
McDaniel (10) Patent No.: US 6,851,006 B2
(45) Date of Patent: Feb. 1, 2005

(54) INTERRUPTION HANDLER-OPERATING SYSTEM DIALOG FOR OPERATING SYSTEM HANDLING OF HARDWARE INTERRUPTIONS

(75) Inventor: Daryl V. McDaniel, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 09/939,067

(22) Filed: Aug. 25, 2001

(65) Prior Publication Data

US 2003/0041232 A1 Feb. 27, 2003

(51) Int. Cl.[7] .............................................. G06F 13/24
(52) U.S. Cl. ...................... 710/260; 710/261; 710/262; 710/263; 710/264; 710/265; 710/266; 710/267; 710/268; 710/269; 714/34
(58) Field of Search .............................. 710/260–269; 714/34

(56) References Cited

U.S. PATENT DOCUMENTS

| | | | | |
|---|---|---|---|---|
| 5,390,300 | A | * | 2/1995 | Pribnow et al. ............. 718/103 |
| 5,699,502 | A | * | 12/1997 | Swanberg et al. ............ 714/24 |
| 5,768,599 | A | * | 6/1998 | Yokomizo .................... 710/260 |
| 6,003,108 | A | * | 12/1999 | Thielen ....................... 710/260 |
| 6,092,144 | A | * | 7/2000 | Thielen ....................... 710/269 |
| 6,587,966 | B1 | * | 7/2003 | Chaiken et al. ............... 714/34 |
| 6,606,676 | B1 | * | 8/2003 | Deshpande et al. ......... 710/262 |
| 6,615,288 | B1 | * | 9/2003 | Herzi ........................... 710/10 |
| 6,675,324 | B2 | * | 1/2004 | Marisetty et al. ............. 714/30 |
| 6,694,457 | B2 | * | 2/2004 | McKee ......................... 714/38 |
| 6,697,834 | B1 | * | 2/2004 | Dice ........................... 718/102 |
| 6,789,142 | B2 | * | 9/2004 | Diamant ....................... 710/48 |
| 2002/0032822 | A1 | * | 3/2002 | Plummer et al. ........... 710/260 |
| 2002/0116563 | A1 | * | 8/2002 | Lever ......................... 710/260 |
| 2003/0051190 | A1 | * | 3/2003 | Marisetty et al. ............. 714/11 |

OTHER PUBLICATIONS

Jeffay, Kevin, et al., "Accounting for Interrupt Handling Costs in Dynamic Priority Task Systems," Dec. 1–3, 1993, IEEE, Proceedings: Real–Time Systems Symposium, p. 212–221.*
Schaelicke, Lambert, et al., "Profiling I/O Interrupts in Modern Architectures," Aug. 29–Sep. 1, 2000, Proceedings: 8th International Symposium on Modeling, Analysis and Simulation of Computer and Telecommunication Systems, p. 115–123.*
Intel IA–64 Architecture Software Developer's Manual, vol. 2: IA–64 System Architecture, Revision 1.1, Jul. 2000, Document No. 245318–002, table of contents, and chapters 5 and 11.1–11.7.

* cited by examiner

Primary Examiner—Mark H. Rinehart
Assistant Examiner—Donna K. Mason
(74) Attorney, Agent, or Firm—Law Offices of Michael Dryja; Abdy Raissinia (57) ABSTRACT

Starting and establishing a dialog between an interruption handler and an operating system for handling of hardware interruptions by the operating system is disclosed. A recommendation for handling such an interruption, and information regarding the interruption, are stored by the interruption handler in a storage accessible by the operating system. The interruption handler calls the operating system at a predetermined interruption handling point thereof, for the operating system to handle the interruption. The handler then determines whether the operating system handled the interruption according to the recommendation.

20 Claims, 6 Drawing Sheets

INTERRUPTION HANDLER-OPERATING SYSTEM DIALOG FOR OPERATING SYSTEM HANDLING OF HARDWARE INTERRUPTIONS

BACKGROUND OF THE INVENTION

1. Technical Field

This invention relates generally to hardware interruptions, such as processor interruptions, and more particularly to the handling of such interruptions by an operating system, as called by an interruption handler for such handling.

2. Description of the Prior Art

The processors of modern computer systems typically have the ability to generate interruptions. Interruptions can be generally defined as events that occur during processing of instructions by the processor. In one type of processor architecture, the Intel Architecture-64 (IA-64), which includes ITANIUM processors manufactured by Intel Corp., of Santa Clara, Calif., there are four different types of interruptions. These types are aborts, interrupts, faults, and traps.

Aborts occur when the processor has detected an internal malfunction, referred to as a machine check (MCA), or a processor reset (RESET). The abort may cause the processor to suspend the instruction stream at an unpredictable location, with partially updated register or memory state. Interrupts are generated by an external or independent entity, such as an input/output (I/O) device, a timer event, or another processor. Faults result from processor instructions that request actions that cannot or should not be carried out, or when system intervention is required before an instruction is executed. Somewhat similarly, traps result from processor instructions in which system intervention is required immediately after an execution is executed.

Interruptions can be handled within the processor itself, by system firmware, or by an operating system executed by the processor. In the IA-64 processor architecture, interruption vector address (IVA)-based interruptions are serviced by the operating system, whereas processor abstraction layer (PAL)-based interruptions are serviced by the firmware of the processor or the operating system. In this architecture, all aborts and some interrupts are PAL-based interruptions. All faults and traps, and some interrupts, are IVA-based interruptions.

For machine check aborts in particular, the processor transfers execution to a processor error handler in the PAL, which itself transfers execution to a platform error handler in a system abstraction layer (SAL) of the architecture. The platform error handler, also referred to as a machine check handler (MCH), in turn transfers execution to the operating system's MCH, at a predetermined handling point in the operating system. The operating system's MCH ultimately returns execution to the platform error handler.

However, operating system responsibility for handling machine check aborts can be problematic. Each operating system that may run on the processor architecture must have the necessary intelligence to interpret the machine check aborts in the context of the system hardware implementation, and determine an appropriate course of action as to remedying the problem. The processor architecture itself typically only passes the abort to the operating system, usually without providing any further information regarding the machine check.

This means that for a number of different operating systems that may run on the processor architecture, duplication of effort is required so that each operating system is able to properly handle machine check aborts and other interruptions. The common entity in such different computer systems, the processor architecture, only passes the machine checks to the currently running operating system, without providing any further information regarding the aborts or recommendation as to course of action for handing the aborts. For these described reasons, as well as other reasons, there is a need for the present invention.

SUMMARY OF THE INVENTION

The invention relates to a dialog between an interruption handler and an operating system for handling of hardware interruptions by the operating system. In a method of the invention, a recommendation for handling such an interruption, and information regarding the interruption, are stored by the interruption handler in a storage accessible by the operating system. The interruption handler calls the operating system at a predetermined interruption handling point of the operating system, for the operating system to handle the interruption. The handler then determines whether the operating system handled the interruption according to the recommendation.

A system of the invention includes a storage, a processor generating an interruption, an interruption handler, and an operating system. The interruption handler receives the interruption. The handler stores a recommendation for handling the interruption and information regarding the interruption in the storage. The operating system has a predetermined interruption handling point that is called by the interruption handler. The handler subsequently examines the storage to determine whether the operating system handled the interruption according to the recommendation.

An article of manufacture includes a computer-readable medium, and means in the medium. The means is for storing a recommendation for handling a processor interruption and information regarding the interruption in an error log. The means is also for calling an operating system at a predetermined interruption handling point. The means is finally for examining a storage to determine whether the operating system handled the interruption according to the recommendation. Other features of the invention will become apparent from the following detailed description of the presently preferred embodiment of the invention, taken in conjunction with the accompanying drawings.

BRIEF DESCRIPTION OF THE DRAWINGS

The method of FIG. 5 can be implemented in conjunction with architecture of FIGS. 2–4.

DESCRIPTION OF THE PREFERRED EMBODIMENT

Overview

Figure 1:
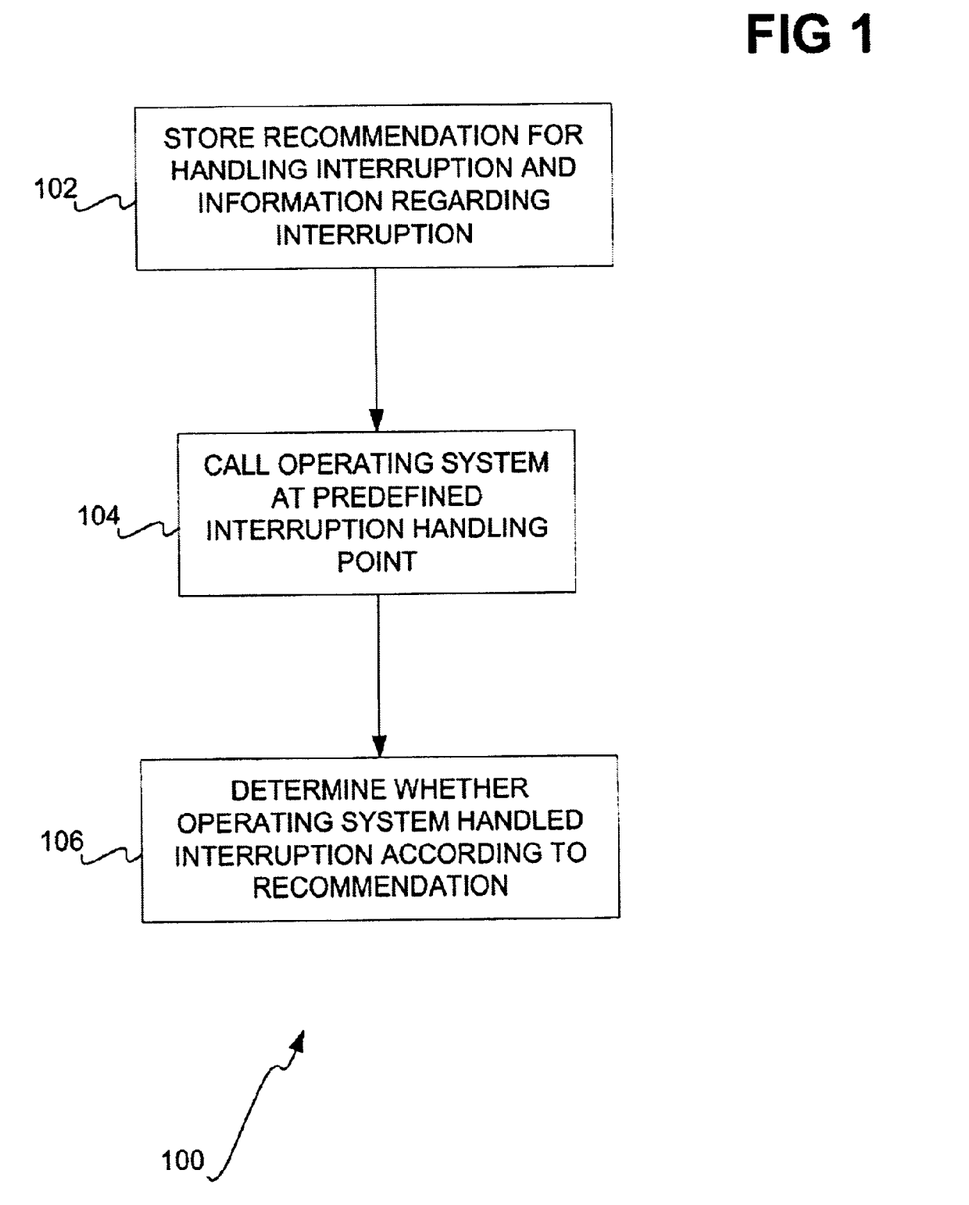
FIG. 1 is a flowchart of a method according to a preferred embodiment of the invention, and is suggested for printing on the first page of the issued patent.

FIG. 1 shows a method 100 of the preferred embodiment of the invention. When an interruption such as a machine check occurs, the machine check handler of the processor, or another type of interruption handler, stores a recommendation for handling the interruption, and information regarding the interruption (102). The recommendation and information are stored in a storage accessible by the operating system running on the processor. For instance, they may be stored in the error log and/or one or more registers of the processor accessible by the operating system.

The machine check handler then calls the operating system at a predetermined interruption handling point (104). The manner by which the predetermined point is established is preferably specified by the processor architecture itself, so that even if the operating system is not aware that the machine check handler is providing a recommendation for handling and information regarding the abort, it is still compatible with the machine check handler doing so. The operating system thus can either not be aware of the recommendation, and service the interruption as if the machine check handler had not provided it, or can service the interruption according to the recommendation by the machine check handler.

The machine check handler ultimately determines whether the operating system handled the interruption according to its recommendation (106). A register may be used by the operating system to store status information regarding its handling of the interruption, which the machine check handler examines to determine if its contents have changed. If the register's contents have changed, this preferably means that the operating system at least attempted to handle the interruption according to the recommendation, where different values signify different statuses. If the contents did not change, this preferably means that the operating system was unaware of the recommendation, and processed the interruption as if no recommendation were provided.

A dialog between the machine check handler and the operating system is thus preferably achieved for handling the interruption. The operating system does not have to have programmed therein alternatives for the proper handling of the machine check, but rather can rely on the recommendation formulated by the machine check handler. This alleviates the burden of proper handling of the abort by the operating system, even though it is still servicing the abort.

Technical Background

Figure 2:
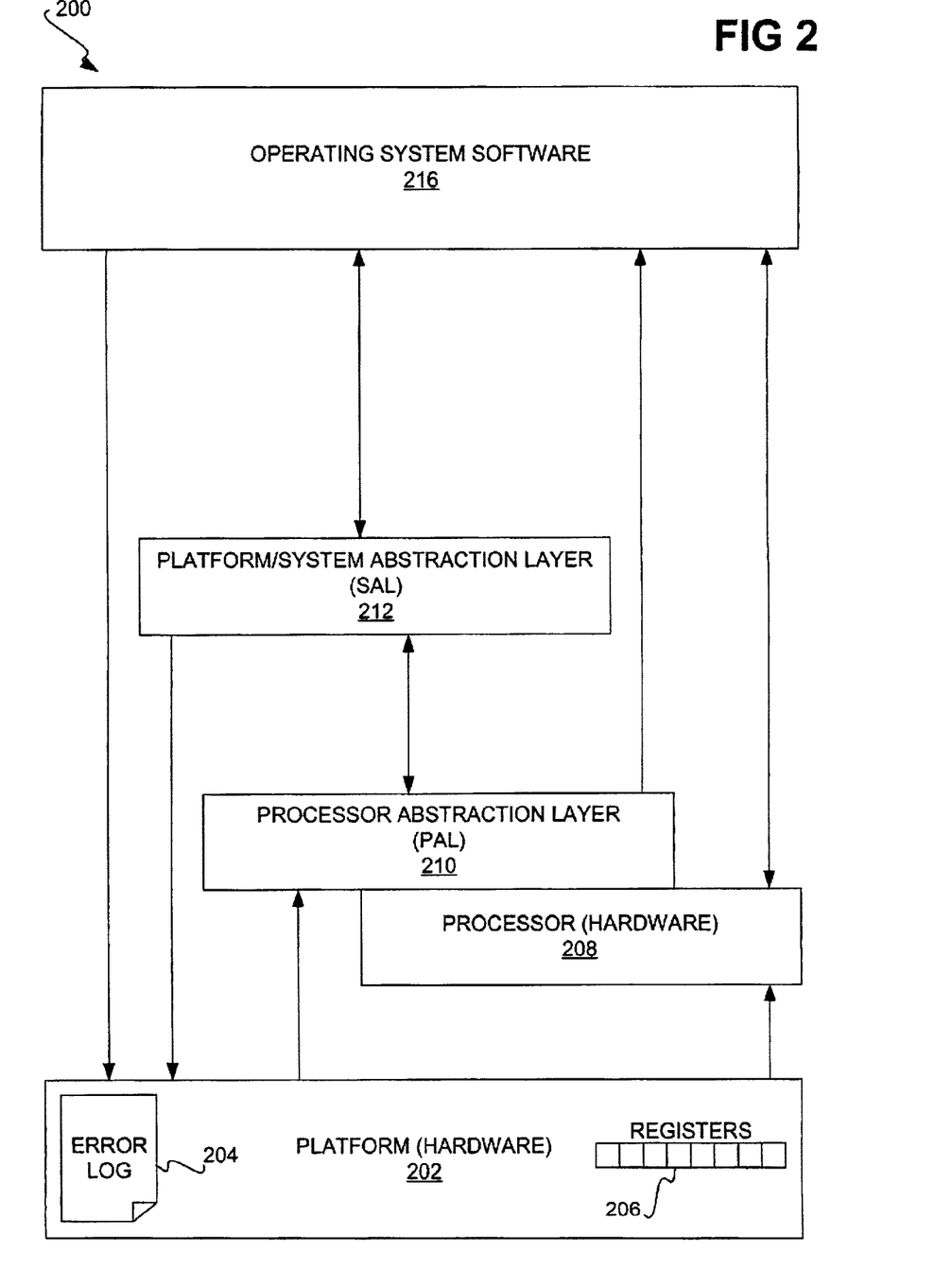
FIG. 2 is a diagram of an example hardware architecture in conjunction with which embodiments of the invention may be implemented.

FIG. 2 shows an example processor architecture 200 in conjunction with which embodiments of the invention may be implemented. The architecture 200 is specifically that of the IA-64 architecture, but the invention itself may be implemented in conjunction with other processor architectures as well. The architecture includes platform hardware 202, processor hardware 208, a processor abstraction layer (PAL) 210, a system abstraction layer (SAL) 212, and operating system software 216.

The platform hardware 202 is the hardware, other than the processor, on which the operating system 216 is running. As shown in FIG. 2, the hardware 202 can include an error log 204 and one or more registers 206. The error log 204 and the registers 206 are generally referred to as storages, or parts of the same storage, in that they can store information. Additionally, other components of the architecture 200 may include the log 204 and the registers 206, specifically the processor hardware 208. The processor hardware 208 is the processor that executes instructions provided by the operating system software 216 and other components of the architecture 200 to run application programs and otherwise allow a computer system of which the architecture 200 is a part to run.

The PAL 210 provides a consistent firmware interface to abstract processor implementation-specific features to the other components of the architecture 200. The SAL 212 isolates operating system and other higher-level software from implementation differences in the platform hardware 202. The PAL 210 and the SAL 212 are considered firmware of the architecture 200. The firmware is typically stored in non-volatile memory, and may be part of the same semiconductor die on which the processor 208 resides.

Figure 3:
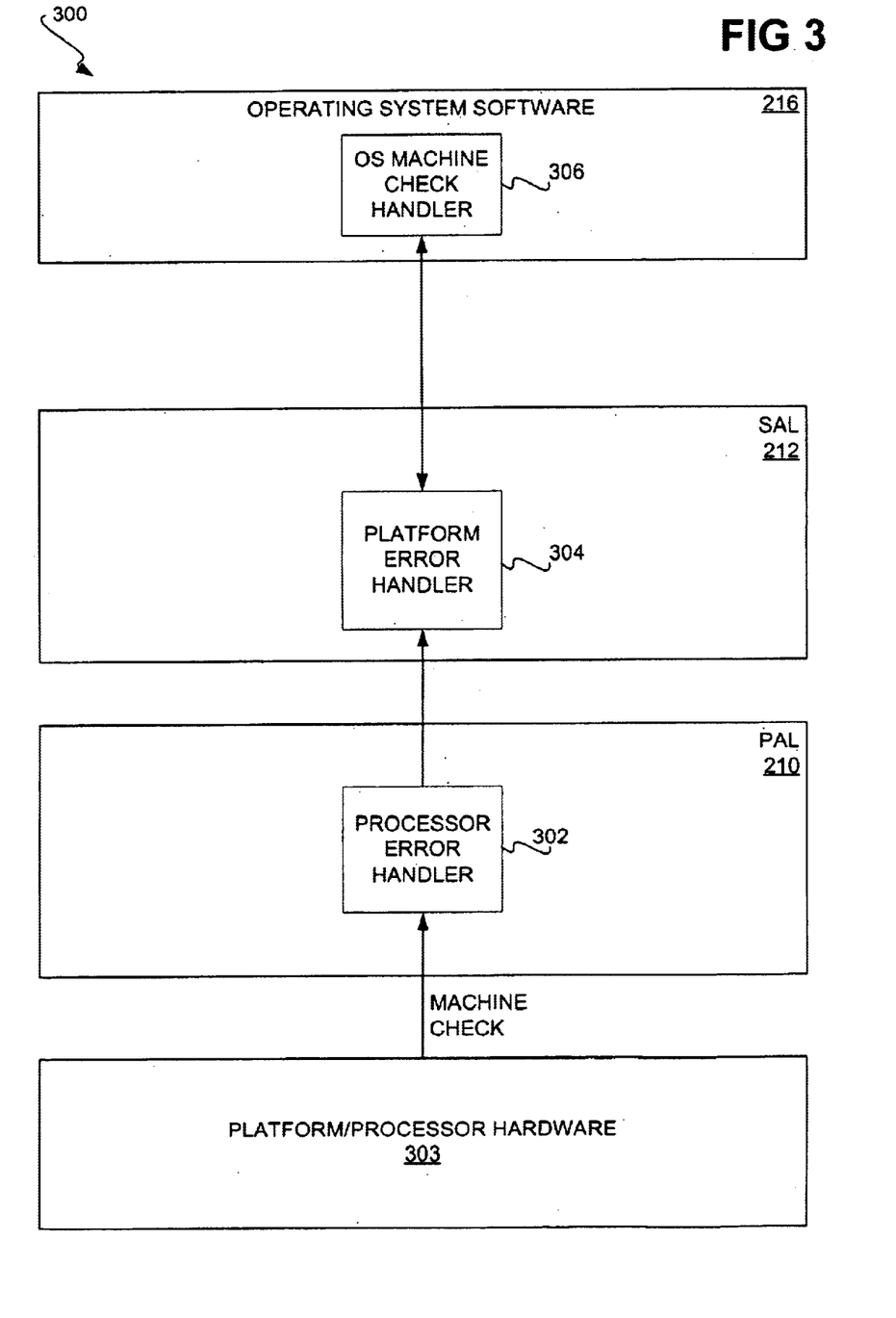
FIG. 3 is a diagram of the architecture of FIG. 2, showing in more detail the services performed by the components of the architecture specifically for handling machine check aborts.

FIG. 3 shows a firmware services model 300, specifically for the manner by which machine check aborts are handled by the processor architecture 200 of FIG. 2. A machine check 301 occurs at the hardware level 303. The hardware level 303 encompasses both the platform hardware 202 and the processor hardware 208 of FIG. 2, and is passed to a processor error handler 302 service of the PAL 210. The processor error handler 302 in turn passes the abort to the platform error handler 304 service of the SAL 212. The platform error handler 304 may be referred to as a machine check handler (MCH), or more generally as an interruption handler. The platform error handler 304 itself passes the abort to an operating system machine check handler 306 service of the operating system software 216, which services the machine check abort.

Thus, whereas the machine check abort passes through the PAL 210 and the SAL 212, it is the operating system software 216 that ultimately services the machine check. The SAL 212 in particular calls the operating system machine check handler 306 at a predetermined interruption handling point of the operating system 216. In this way, the operating system 216 learns of the machine check abort, and subsequently processes the abort.

Figure 4:
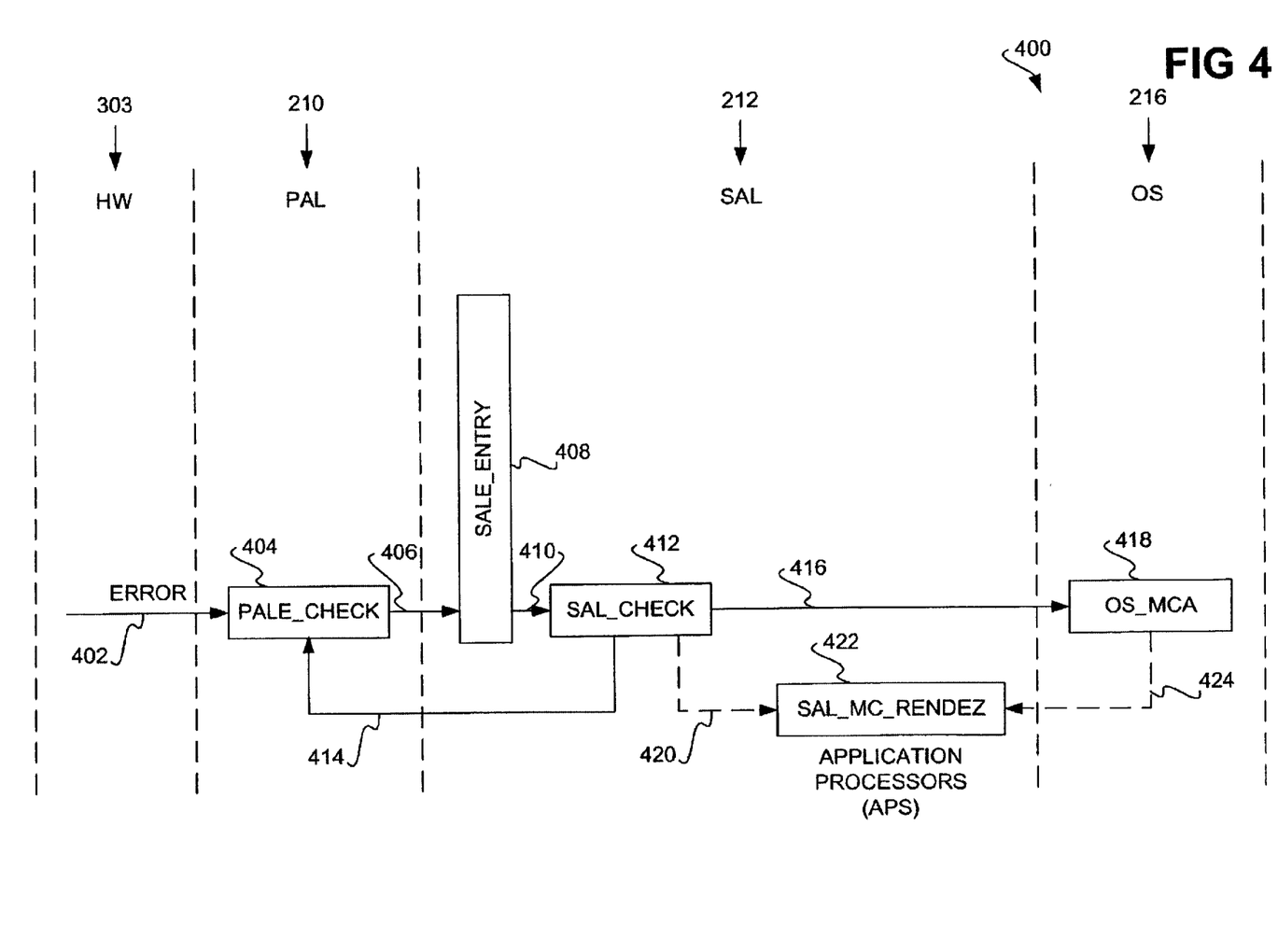
FIG. 4 is a diagram of the architecture of FIG. 2, showing in more detail how the components of the architecture can handle machine check aborts.

FIG. 4 shows in more detail a flow 400 indicating how the services model 300 of FIG. 3, in conjunction with the processor architecture 200 of FIG. 2, handles machine check aborts. The machine check abort generated by the hardware 303 is passed to the PAL 210, as indicated by the arrow 402. More specifically, a particular entry point of the PAL 210 is entered, the PALE_CHECK entry point 404. The PAL 210 in turn passes the machine check to the SAL 212, as indicated by the arrow 406, at a particular entry point of the SAL 212, the SALE_ENTRY entry point 408. The SAL 212 internally transfers the abort to another part thereof, as indicated by the arrow 410, via the SAL_CHECK entry point 412.

The SAL 212 reports back to the PAL 210 that it is handling the machine check abort, as indicated by the arrow 414. The SAL 412 also passes the machine check to the operating system software 216, as indicated by the arrow 416. The operating system software 216 is specifically called at its predetermined interruption handling point, referred to as the OS_MCA entry point 418 in FIG. 4. If other (application) processors are present within the system, the SAL 412 may also pass the machine check to them for service, as indicated by the dotted arrow 420, via the SAL_MC_RENDEZ entry point 422. Similarly, the operating system software 418 may pass the abort to the other processors, as indicated by the dotted arrow 422.

Situation Where Operating System is Aware of Recommendation

Figure 5:
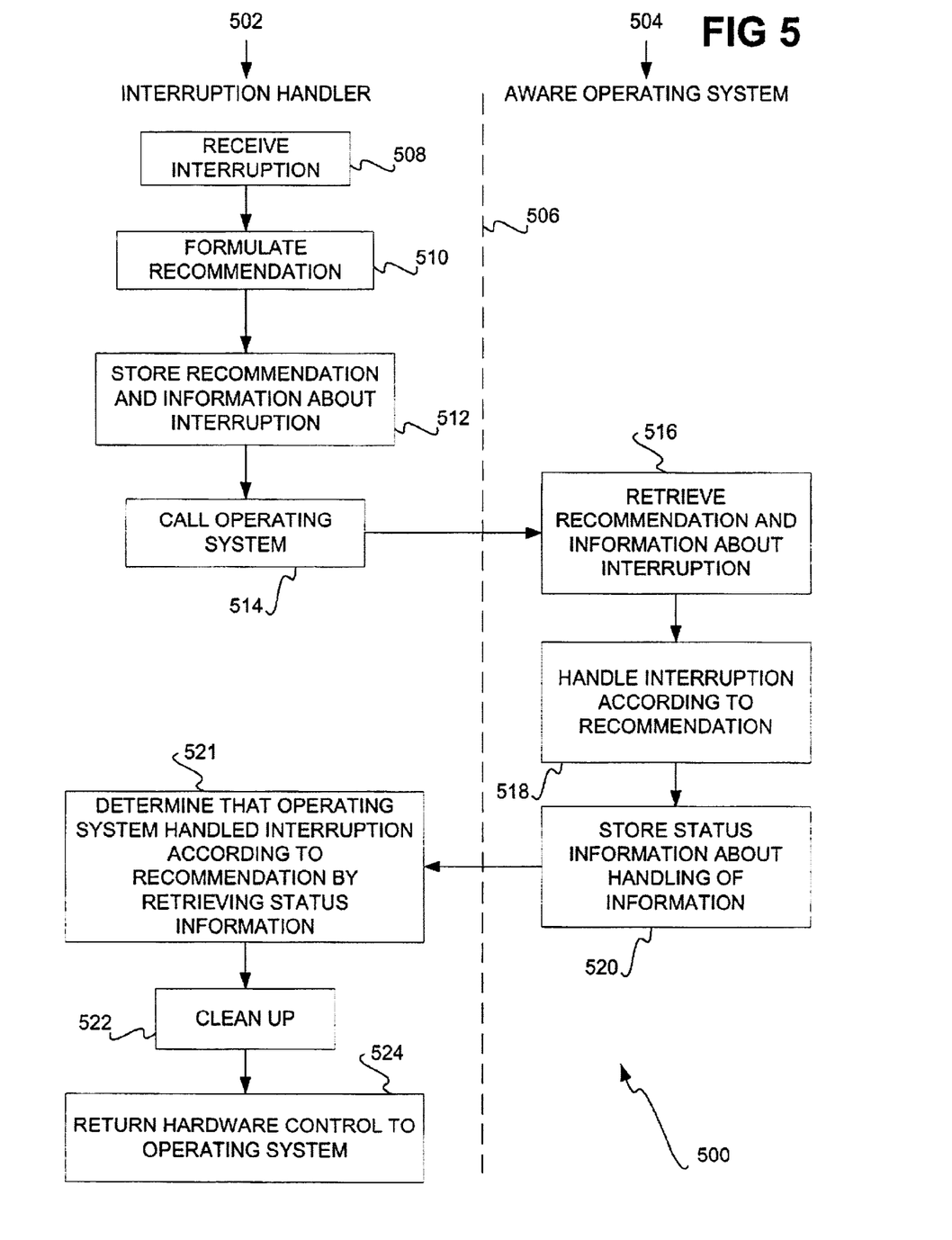
FIG. 5 is a flowchart of a method consistent with the preferred embodiment of FIG. 1, by which a dialog is established between an interruption handler and an operating system for the handling of an interruption, such as a machine check abort, according to an embodiment of the invention.

Embodiments of the invention can be implemented in conjunction with the IA-64 processor architecture specifically described in the previous section of the detailed description, or in conjunction with other processor architectures. FIG. 5 shows a method 500 according to an embodiment of the invention that can be so implemented in conjunction with the IA-64 processor architecture. The method 500 particularly shows the situation where the operating system is aware that the interruption handler of the processor architecture is providing it a recommendation as to the servicing of the interruption. The method 500 may be implemented as one or more means stored in a computer-readable medium of an article of manufacture, such as a recordable data storage medium, or a modulated carrier signal.

Parts of the method 500 are performed by the interruption handler, as indicated by the column 502, and parts of the method 500 are performed by the operating system, as indicated by the column 504, where the columns 502 and 504 are separated by a dotted line 506 in FIG. 5. The interruption handler first receives an interruption (508), such as a machine check abort, or another type of interruption. The interruption may be received, for instance, from the processor or the processor abstraction layer (PAL) of the processor architecture. The interruption handler formulates a recommendation as to appropriate processing of the interruption (510), as opposed to requiring the operating system to formulate the recommendation.

The recommendation and information about the interruption are stored by the interruption handler in a storage accessible by the operating system (512). For instance, in an error log of the processor architecture, the interruption handler may store the recommendation in the first entry thereof, and detailed information about the interruption in subsequent entries of the error log. Additional information may also be stored in a register of the processor architecture, such as the general register 13 (GR13) of the IA-64 processor architecture. The interruption handler then calls the operating system to service the interruption at a predetermined interruption handling point of the operating system (514). This may be the OS_MCA entry point of the operating system, as defined by the IA-64 processor architecture.

The operating system, when so called, is thus able to retrieve the recommendation formulated by the interruption handler, as well as the information stored by the interruption handler (516). This is the case where the operating system has been constructed so that it is aware that the interruption handler is so providing it a recommendation and information regarding the interruption. The operating system preferably handles the interruption according to the recommendation (518), and then stores status information about its handling of the interruption in a storage accessible by the interruption handler (520). For example, the operating system may store the status information in a register, such as the GR13.

The interruption handler can determine that the operating system handled the interruption according to its recommendation by retrieving this status information (521). For instance, the handler may initially store a null or other nominal value in the register, such that the operating system changes the value by storing status information in the register. The interruption handler examines the register to determine whether the operating system changed its contents by storing the status information. Where the contents have changed, presumably by the operating system, the interruption handler concludes that the operating system followed its recommendation in servicing the interruption.

A dialog between the interruption handler and the operating system for servicing the interruption is thus achieved. The status information provided by the operating system and retrieved by the interruption handler closes the loop as to the dialog initiated by the interruption handler in storing a recommendation for servicing the interruption. The status information may indicate, for example, whether the operating system was able to successfully accomplish the recommendation. The interruption handler finally performs any necessary clean up resulting from servicing the interruption (522), and then returns hardware control back to the operating system (524).

Situation Where Operating System is Unaware of Recommendation

The situation described in the previous section of the detailed description related to an operating system that is aware that the interruption handler is formulating recommendations for servicing interruptions. The operating system thus retrieves the recommendations, and preferably follows them in servicing the interruptions. However, an embodiment of the invention is also preferably implemented so that even if an operating system is unaware that the interruption handler is formulating recommendations, the operating system nevertheless is compatible, albeit it does not use the recommendations. That is, preferably the embodiment is consistent with the processor architecture specification itself, even though it is providing recommendations outside of the specification.

Generally, an unaware operating system may directly exit and resume normal operation after being called by the interruption handler and performing its processing related to the interruption. Alternatively, an unaware operating system may return control to the interruption handler without placing status information in a storage. By comparison, an aware operating system preferably always returns control to the interruption handler, with status information being stored in the storage.

Figure 6:
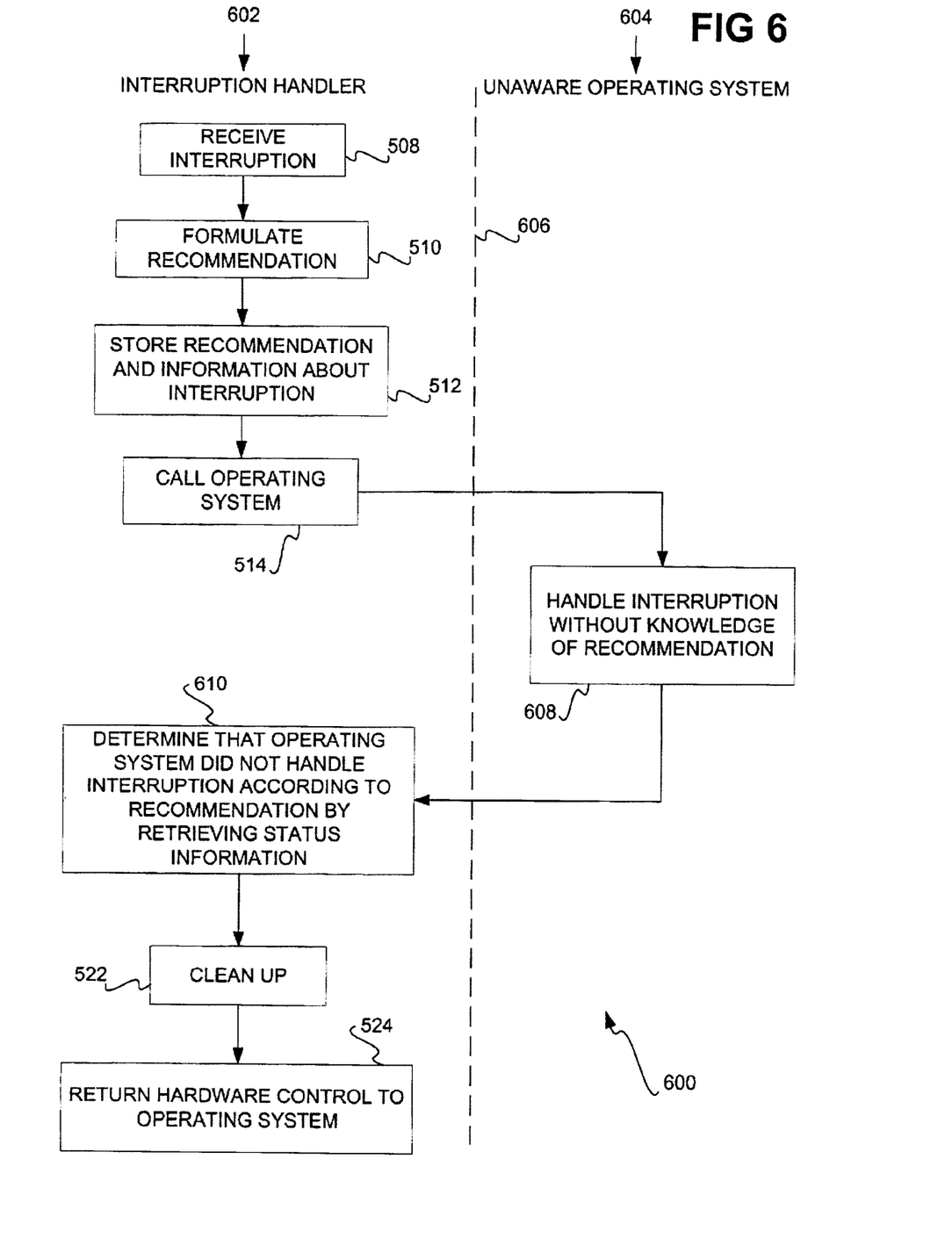
FIG. 6 is a flowchart of a method consistent with the preferred embodiment of FIG. 1, by which a dialog is started by an interruption handler, but is not completed by the operating system, for the handling of an interruption, such as a machine check abort, according to an embodiment of the invention. The method of FIG. 6 can be implemented in conjunction with the architecture of FIGS. 2–4.

FIG. 6 shows a method 600 according to an embodiment of the invention that can be so implemented in conjunction with the IA-64 processor architecture. The method 600 particularly shows the situation where the operating system is unaware that the interruption handler of the processor architecture is providing it a recommendation as to the servicing of the interruption. Like the method 500 of FIG. 6, the method 600 may be implemented as one or more means stored in a computer-readable medium of an article of manufacture, such as a recordable data storage medium, or a modulated carrier signal. Parts of the method 600 are performed by the interruption handler, as indicated by the column 602, and parts are performed by the operating system, as indicated by the column 604, where the columns 602 and 604 are separated by a dotted line 606 in FIG. 6.

As in the method 500, in the method 600, the interruption handler first receives an interruption (508), and formulates a recommendation as to appropriate processing of the interruption (510). The interruption handler stores the recommendation and information about the interruption in a storage accessible by the operating system (512). The interruption handler then calls the operating system to service the interruption, at a predetermined interruption handling point of the operating system (514). However, because the operating system is not aware that the interruption handler is providing it with this recommendation, it handles the interruption without knowledge of the recommendation (608). The operating system may itself formulate a proper course of action for servicing the interruption, but does not rely on the recommendation or otherwise retrieve the information stored by the interruption handler for these purposes.

The interruption handler can determine that the operating system did not retrieve or otherwise follow its recommendation (610). The handler may examine a register, such as the GR 13, in which the operating system would have stored status information if it had been aware and followed the recommendation. For instance, the interruption handler may initially store a null or other predefined value in the register. If the contents of the register do not change after the operating system has serviced the interruption, then this means that the operating system did not attempt to follow its recommendation. Nevertheless, the operating system is able to function, although it does not take advantage of the information provided by the interruption handler. The interruption handler starts a dialog that is not completed by the operating system. The interruption handler, as before, finally performs any necessary clean up (522), and returns hardware control back to the operating system (524).

Advantages Over the Prior Art

Embodiments of the invention allow for advantages over the prior art. Recommendations for handling interruptions are formulated by the interruption handler, and passed to the operating system for servicing the interruptions. The operating system, if so designed, itself does not have to have the knowledge as to how best to service the interruptions, but can instead rely on the recommendations provided by the interruption handler. In this way, a dialog between the interruption handler and the operating system is achieved for processing interruptions. The operating system is aware of and is designed to leverage the recommendation for handling the interruption and the information regarding the interruption stored by the interruption handler.

Furthermore, embodiments of the invention are preferably compatible with existing processor architectures, and with existing operating systems that are not aware that the interruption handler is providing recommendations for handling interruptions. The interruption handler may thus start a dialog that is not completed by the operating system. The operating system is unaware of and is not designed to leverage the recommendation for handling the interruption and the information regarding the information stored by the interruption handler. Nevertheless, the operating system is still able to function, as is the handler, although a complete dialog is not achieved.

The predetermined interruption handling point of the operating system called by the interruption handler is preferably determined in a manner specified by the specification for a given processor architecture. That is, rather than formulating a new processor architecture or a new handling point in an existing processor architecture, embodiments preferably utilize existing architectures and existing handling points, and have the interruption handler store recommendations in locations accessible to the operating system. An aware operating system would then store status of its operations upon the recommendations in one of these locations. These locations may be currently unused registers, error logs, and other locations, as has been indicated.

Alternative Embodiments

It will be appreciated that, although specific embodiments of the invention have been described herein for purposes of illustration, various modifications may be made without departing from the spirit and scope of the invention. For instance, the invention has been substantially described in conjunction with interruptions that are machine check aborts. However, the invention is applicable to any type of interruption for which a dialog between an interruption handler and an operating system can be implemented. As another example, the invention has been substantially described in relation to the IA-64 processor architecture, but is applicable to other processor architectures as well.

Furthermore, an interruption that can be processed by the invention is inclusive of processor-generated interruptions, as have been specifically described herein, as well as external interruptions to which the processor is responding. The dialog achieved by embodiments of the invention is used to pass information about the interruption to the operating system, as has been specifically described herein, as well as for other purposes, such as for passing remediation recommendations to the operating system. Accordingly, the scope of protection of this invention is limited only by the following claims and their equivalents.

I claim:

1. A method performed by an interruption handler to at least start a dialog with an operating system for handling an interruption comprising:

storing, by the interruption handler, a recommendation for the operating system to handle an interruption and information regarding the interruption in a storage accessible by the operating system, the interruption handler separate from the operating system;

calling, by the interruption handler, the operating system at a predetermined interruption handling point of the operating system for the operating system to handle the interruption; and, determining, by the interruption handler, whether the operating system handled the interruption according to the recommendation.

2. The method of claim 1, wherein storing the recommendation for handling the interruption and the information regarding the interruption in the storage accessible by the operating system comprises storing the recommendation and the information in an error log and/or a register accessible by the operating system.

3. The method of claim 1, wherein determining whether the operating system handled the interruption according to the recommendation comprises examining a storage to determine whether the operating system changed contents thereof by storing status information in the storage.

4. The method of claim 1, further initially comprising receiving the interruption.

5. The method of claim 4, further comprising after receiving the interruption from the hardware, formulating the recommendation for handling the interruption.

6. The method of claim 1, further comprising:

performing final cleanup for handling the interruption; and, returning hardware control to the operating system.

7. A system comprising:

a storage;

a processor generating an interruption;

an interruption handler receiving the interruption, and staring a recommendation for handling the interruption and information regarding the interruption in the storage; and, an operating system having a predetermined interruption handling point called by the interruption, handler for the operating system to handle the interruption the interruption handler subsequently examining the storage to determine whether the operating system handled the interruption according to the recommendation, the interruption handler separate from the operating system.

8. The system of claim 7, wherein the storage comprises an error log having a first and subsequent entries, the interruption handler storing the recommendation for handling the interruption in the first entry, and at least part of the information regarding the interruption in the subsequent entries.

9. The system of claim 7, wherein the storage comprises a register in which the interruption handler stores part of the information regarding the interruption, and which the interruption handler examines for status information stored therein by the operating system to determine whether the operating system handled the interruption according to the recommendation.

10. The system of claim 7, wherein the interruption generated by the processor comprises an interruption selected from the group of interruptions essentially consisting of: an abort, an interrupt, a fault, and a trap.

11. The system of claim 7, wherein the interruption generated by the processor comprises a machine check abort.

12. The system of claim 7, wherein the interruption handler is part of a system abstraction layer of the system.

13. The system of claim 7, wherein the operating system is aware of and is designed to leverage the recommendation for handling the interruption and the information regarding the interruption stored by the interruption handler in the storage, such that the operating system and the interruption handler achieve a dialog as to handling the interruption.

14. The system of claim 7, wherein the operating system is unaware of and is not designed to leverage the recommendation for handling the interruption and the information regarding the interruption stored by the interruption handler in the storage, such that the operating system and the interruption handler are able to function, but without achieving a dialog as to handling the interruption.

15. An article comprising:

a computer-readable medium; and, means in the medium for storing a recommendation for operating system handling a processor interruption and information regarding the interruption in a storage, for calling an operating system at a predetermined interruption handling point for the operating system to handle the interruption, and for examining the storage to determine whether the operating system handled the interruption according to the recommendation, the means separate from the operating system.

16. The article of claim 15, wherein the means in the medium examines the storage for status information stored therein by the operating system to determine whether the operating system handled the interruption according to the recommendation.

17. The article of claim 15, wherein the means in the medium is further for formulating the recommendation for handling the interruption.

18. The article of claim 15, wherein the interruption is selected from the group of interruptions essentially consisting of: an abort, an interrupt, a fault, and a trap.

19. The article of claim 15, wherein the medium is a recordable data storage medium.

20. The article of claim 15, wherein the medium is a modulated carrier signal.

* * * * *